(12) United States Patent
Verplaetse et al.

(10) Patent No.: US 12,732,725 B2
(45) Date of Patent: Sep. 8, 2026

(54) TUNING OF RECEIVER COMPONENTS IN AN OPTICAL LINE TERMINAL

(71) Applicant: Nokia Solutions and Networks Oy, Espoo (FI)

(72) Inventors: Michiel Verplaetse, Nazareth (BE); Werner Coomans, Zellik (BE)

(73) Assignee: Nokia Solutions and Networks Oy, Espoo (FI)

( * ) Notice: Subject to any disclaimer, the term of this patent is extended or adjusted under 35 U.S.C. 154(b) by 286 days.

(21) Appl. No.: 18/589,560

(22) Filed: Feb. 28, 2024

(65) Prior Publication Data

US 2024/0292133 A1 Aug. 29, 2024

(30) Foreign Application Priority Data

Feb. 28, 2023 (EP) .................................... 23159193

(51) Int. Cl.
*H04B 10/00* (2013.01)
*H04Q 11/00* (2006.01)

(52) U.S. Cl.
CPC . *H04Q 11/0067* (2013.01); *H04Q 2011/0086* (2013.01)

(58) Field of Classification Search
CPC ....... H04Q 11/0067; H04Q 2011/0086; H04Q 2011/0064; H04Q 11/0062; H04Q 2011/0088; H04B 10/272
See application file for complete search history.

(56) References Cited

U.S. PATENT DOCUMENTS

2013/0265444 A1 10/2013 Walsh et al.
2016/0105236 A1 4/2016 Zhang et al.
2023/0403082 A1* 12/2023 Koma .................... H04B 10/85
2024/0267658 A1* 8/2024 Van Veen ........... H04Q 11/0067
2024/0292133 A1* 8/2024 Verplaetse ......... H04Q 11/0067

OTHER PUBLICATIONS

Search Report for European Application No. 23159193.4 dated Aug. 4, 2023.

(Continued)

*Primary Examiner* — Agustin Bello
(74) *Attorney, Agent, or Firm* — Brake Hughes Bellermann LLP

(57) ABSTRACT

Example embodiments describe an optical line terminal (OLT) configured to communicate in a point-to-multipoint optical network with optical network units (ONUs); where upstream burst signals originating from one or more ONUs can be received by the OLT at any time during a time window. The OLT is configured to perform, during the time window, initiating a tuning cycle by starting the tuning of one or more burst receiver components within the OLT. The OLT is further configured to perform, if detecting a burst signal within a first period, extending the tuning cycle by a second period to continue the tuning of the one or more burst receiver components. The OLT is further configured to perform, if detecting at least pattern within the second period, extending the tuning cycle to decode the burst signal; else, terminating the tuning cycle by initiating a next tuning cycle.

13 Claims, 5 Drawing Sheets

(56) References Cited

OTHER PUBLICATIONS

ITU-T Telecommunication Standardization Sector of ITU, G.9804.3, Series G: Transmission Systems and Media, Digital Systems and Networks, "50-Gigabit-capable passive optical networks (50G-PON): Physical media dependent (PMD) layer specification," Sep. 2021, pp. 1-50.

ITU-T Telecommunication Standardization Sector of ITU, G.989, Series G: Transmission Systems and Media, Digital Systems and Networks, "40-Gigabit-capable passive optical networks (NG-PON2): Definitions, abbreviations and acronyms," Sep. 2015, pp. 1-32.

ITU-T Telecommunication Standardization Sector of ITU, G.987, Series G: Transmission Systems and Media, Digital Systems and Networks, "10-Gigabit-capable passive optical network(XG-PON) systems: Definitions, abbreviations and acronyms," Jun. 2012, pp. 1-26.

ITU-T Telecommunication Standardization Sector of ITU, G.984.4, Series G: Transmission Systems and Media, Digital Systems and Networks, "Gigabit-capable Passive Optical Networks (G-PON): ONT management and control interface specification," Feb. 2008, pp. 1-430.

ITU-T Telecommunication Standardization Sector of ITU, G.9807.1, Series G: Transmission Systems and Media, Digital Systems and Networks, 10-Gigabit-capable symmetric passive optical network (XGS-PON), Feb. 2023, pp. 1-290.

* cited by examiner

TUNING OF RECEIVER COMPONENTS IN AN OPTICAL LINE TERMINAL

CROSS-REFERENCE TO RELATED APPLICATIONS

This application claims priority to and the benefit of European Patent Application No. 23159193.4 filed on Feb. 28, 2023, the entire contents of each of which are incorporated herein by reference.

TECHNICAL FIELD

Various example embodiments relate to an apparatus and a method for managing tuning of burst receiver components within an optical line terminal, OLT, in a point-to-multipoint optical network.

BACKGROUND

In point-to-multipoint optical networks, e.g. a passive optical network, PON, at least one optical line terminal, OLT, at the network side connects to a plurality of optical network units, ONUs, at the user side. Decoding an upstream signal received by the OLT typically requires tuning receiver components within the OLT, e.g. a transimpedance amplifier, a clock and data recovery device, an equalizer, and a decoder. The tuning can be optimized as a timeslot for transmitting upstream signals is assigned to each ONU in the network, i.e. as the time of arrival of the upstream signals is known.

Some modes of operation allow ONUs to transmit upstream signals at any time during a predetermined time window, e.g. during ONU activation and during contention-based allocation. Thus, burst signals can be received by the OLT at any time during such a time window. As such, tuning the receiver components is a challenge as the time of arrival of these burst signals are unknown to the OLT.

SUMMARY

The scope of protection sought for various embodiments of the invention is set out by the independent claims. The embodiments and features described in this specification that do not fall within the scope of the independent claims, if any, are to be interpreted as examples useful for understanding various embodiments of the invention.

Amongst others, it is an object of embodiments of the invention to avoid excessive and/or superfluous tuning of burst receiver components during a time window wherein burst signals from one or more ONUs can be received at any time.

This object is achieved, according to a first example aspect of the present disclosure, by an optical line terminal, OLT, configured to communicate in a point-to-multipoint optical network with optical network units, ONUs; wherein upstream burst signals originating from one or more ONUs can be received by the OLT at any time during a time window. The OLT comprising means configured to perform, during the time window, initiating a tuning cycle by starting the tuning of one or more burst receiver components within the OLT. The means further being configured to perform, if detecting a burst signal within a first period, extending the tuning cycle by a second period to continue the tuning of the one or more burst receiver components. The means further being configured to perform, if detecting at least one predetermined pattern within the burst signal within the second period, extending the tuning cycle to decode the burst signal. Else, terminating the tuning cycle by initiating a next tuning cycle.

The OLT thus comprises one or more burst receiver components for receiving and decoding burst signals from ONUs. An ONU may be included in the optical network, i.e. a connected ONU, or may seek to join the optical network, i.e. a joining ONU. The time window may be an interval in time during which ONUs are allowed to transmit upstream burst signals freely, i.e. at any time. The time window can, for example, be a quiet window during ONU activation and/or a period during which ONU traffic is scheduled according to contention-based allocation. As such, one or more burst signals can be received by the OLT at any time during the time window. To correctly decode a burst signal at the OLT, the one or more burst receiver components require tuning to the burst signal. This may, for example, be achieved by adjusting the settings of one or more burst receiver components based on a known bit pattern within the burst signal or a predetermined portion of the burst signal.

A first period of a tuning cycle is initiated by starting the tuning of one or more burst receiver components. During this first period, the one or more burst receiver components gradually converge or settle to a partially tuned state. This partially tuned state allows more reliable detecting of the presence of burst signals at the OLT, as more responsive and more reliable indicators for the presence of a burst signal can be used, e.g. compared to untuned burst receiver components.

If the presence of a burst signal is detected within the first period of the tuning cycle, the tuning cycle is extended by a second period. This allows providing more time to the one or more burst receiver components to continue their respective tuning. Else, if no burst signal is detected within the first period, the tuning cycle is terminated by initiating a next tuning cycle. This allows avoiding superfluous tuning time as continuing the tuning of the one or more burst receiver components is futile when no burst signal is present. This has the advantage that activation of ONUs during a ranging procedure can be more efficient, as the time to successfully perform the ranging procedure can be reduced. It is a further advantage that contention-based allocation of ONUs can be more efficient. It is a further advantage that burst receiver components with a substantial tuning time can be tuned efficiently, and that a substantial number of burst receiver components can be tuned efficiently.

If the presence of a burst signal is established during the first period, the burst signal is searched for the at least one predetermined pattern during the second period. The predetermined pattern may indicate that the OLT has not missed any valuable data within the burst signal. In other words, the predetermined pattern may precede the valuable data within a burst signal. Valuable data may include any portion of the burst signal that includes information intended for the OLT that is not solely used for tuning the burst receiver components, for delineation, or for time alignment. Valuable data may for example include, amongst others, payload data bits, control bits, headers, metadata, a frame check sequence, and framing bits. Searching for the at least one predetermined pattern can include matching at least one known bit pattern to the received bit pattern within the burst signal. A plurality of predetermined patterns may be detected within the burst signal, either in a predetermined order or simultaneously.

If the at least one predetermined pattern is detected within the burst signal during the second period, the tuning cycle is again extended to allow decoding of the burst signal. After completing the decoding of the burst signal, a next tuning cycle may be initiated. If the at least one predetermined pattern is not detected within the second period, the tuning cycle is terminated by initiating a next tuning cycle. This further improves the efficiency of ONU activation and/or contention-based allocation as decoding of burst signals with missing valuable data can be avoided, i.e. decoding of invalid burst signals can be avoided.

Tuning cycles are thus initiated iteratively throughout the time window, while providing an early termination of futile tuning cycles upon completion of the first period or upon completion of the second period. This allows limiting delays during the activation of joining ONUs in an optical network and allows improving contention-based functions in optical networks.

According to an example embodiment, the first period may be a predetermined amount of time indicative for a minimum tuning time for the one or more burst receiver components to detect a burst signal with a predetermined accuracy.

The first period may thus provide sufficient time for the one or more burst receiver components to be partially tuned such that a burst signal can be detected with a predetermined accuracy. This allows ruling out the presence of a burst signal at the OLT upon completion of the first period with a predetermined probability or certainty. The minimum tuning time may be associated with the one or more burst receiver components that provide an indicator for detecting the presence of a burst signal. In other words, the minimum tuning time may be associated with a source of an indicator used for detecting a burst signal. For example, the predetermined amount of time may be based on the minimum tuning time required by a transimpedance amplifier to detect the presence of a burst signal with the predetermined accuracy.

According to an example embodiment, the second period may be a predetermined amount of time indicative for a minimum tuning time for the one or more burst receiver components to achieve a tuned state to detect the at least one predetermined pattern within the burst signal with a predetermined accuracy.

The second period may thus provide sufficient time for the one or more burst receiver components to reach a tuned state such that the at least one predetermined pattern can be detected with a predetermined accuracy. This allows ruling out the presence of the predetermined pattern within the burst signal upon completion of the second period with a predetermined probability or certainty. The tuned state may be characterized by a certain level or extent of tuning, i.e. a certain level of convergence to the burst signal being received. The tuned state may correspond to a substantially completed tuning of the one or more burst receiver components. This allows reliable detecting of the predetermined pattern within the second period. The one or more burst receiver components may continue to be tuned after achieving the tuned state.

According to an example embodiment, the means may further be configured to perform extending the tuning cycle by a third period upon detecting the at least one predetermined pattern within the burst signal within the second period; wherein the third period is characterized by an amount of time to complete the decoding of the burst signal.

The tuning cycle may thus be extended for a duration that is sufficient to completely decode the burst signal. The length or duration of the third period may be different for respective tuning cycles, e.g. depending on the amount of valuable data within a burst signal. Alternatively, the length or duration of the third period may be fixed when the amount of valuable data within each burst signal is fixed or known a priori, e.g. during ranging.

According to an example embodiment, the means may further be configured to perform the initiating of a tuning cycle by simultaneously resetting the respective one or more burst receiver components to start the tuning of the one or more burst receiver components.

Starting the tuning of one or more burst receiver components may thus include resetting the one or more burst receiver components. This initiates a tuning cycle or a next tuning cycle. Resetting the one or more burst components at the start of a tuning cycle allows detecting burst signals at the OLT during the first period more reliably, as more responsive and more reliable indicators for the presence of a burst signal can be used. The reset further allows improving the performance of burst receiver components compared to receiver components that are not reset, i.e. always-on components. The resetting of the one or more burst receiver components may further be performed at substantially the same time. This allows the burst receiver components to be tuned for the duration of the first period.

According to an example embodiment, the means may further be configured to perform the initiating of a tuning cycle by resetting the respective one or more burst receiver components according to a predetermined sequence and/or a predetermined timing to start the tuning of the one or more burst receiver components.

The respective one or more burst receiver components may thus be reset at different times and/or in a predetermined order. This allows controlling the resetting of the respective burst receiver components to optimize the performance of the respective burst receiver components. This has the further advantage that the detection of a burst signal can be improved as some burst receiver components can maintain a partially tuned state or a tuned state obtained during a previous tuning cycle for a portion of the first period. It is a further advantage that burst receiver components characterized by a substantial tuning time can start tuning earlier.

According to an example embodiment, the means may further be configured to perform, during the time window, initiating a next tuning cycle after decoding a burst signal.

Tuning cycles can thus be performed iteratively throughout the time window, i.e. until the time window ends. This allows decoding a plurality of burst signals during a single time window. This has the further advantage that, during ONU activation, a plurality of ONUs can join the optical network during a single quiet window.

According to an example embodiment, the means may further be configured to perform the detecting of a burst signal based on one or more detection signals associated with the respective one or more burst receiver components; wherein the one or more detection signals are indicative for the presence of a burst signal at the OLT.

The one or more detection signals can thus be indicators for the presence of a burst signal at the OLT. These detection signals may be provided to the means within the OLT by one or more burst receiver components. It is a further advantage that the burst signal can be detected more reliably as the detection of a burst signal can be based on a plurality of detection signals that are provided by different sources, i.e. provided by different burst receiver components.

According to an example embodiment, the one or more burst receiver components may be selected from the group comprising a transimpedance amplifier, a clock data recovery device, an equalizer, and a decoder.

The means allow particular efficient tuning of burst receiver components when equalization of upstream traffic signals is required, i.e. when the OLT comprises an equalizer, as the tuning time of an equalizer is substantial.

According to an example embodiment, the respective one or more detection signals may be a received signal strength indicator, RSSI; an output of the transimpedance amplifier; an output of the clock data recovery device; an indicator of the tuning behaviour of the equalizer; and/or an output of the equalizer.

An RSSI can, for example, be provided by a transimpedance amplifier, an RSSI circuitry, or derived from photodiode biasing conditions. These detection signals can allow fast and reliable detection of burst signals, in particular in addition to resetting the one or more burst receiver components. For example, resetting a transimpedance amplifier at the start of a tuning cycle can allow improving the performance of an RSSI circuit within the transimpedance amplifier. Using an output of the transimpedance amplifier as the detection signal has the further advantage that burst signal detection is faster, as signal detection can be performed on a high-speed signal path.

According to an example embodiment, the means may further be configured to perform the detecting of the at least one predetermined pattern within the burst signal by detecting a preamble pattern and/or a delimiter pattern indicative for the start of valuable data within a burst signal.

The at least one predetermined pattern that is detected during the second period may thus include a preamble and/or a delimiter, i.e. known bit patterns within the burst signal. The preamble and delimiter precede the valuable data within the burst signal. The delimiter may separate the preamble from the valuable data. Detecting the at least one predetermined pattern can thus include detecting a known preamble pattern within the burst signal, and/or detecting a known delimiter pattern within the burst signal. Detecting a known delimiter pattern can further be performed after detecting a known preamble pattern. In other words, detecting a known preamble pattern can be performed during a first portion of the second period, and detecting a known delimiter pattern can be performed during a second portion of the second period. This can further allow terminating the tuning cycle if the preamble pattern is not found within the burst signal during the first portion of the second period.

According to an example embodiment, the means may comprise at least one processor, and at least one memory including computer program code; the at least one memory and computer program code being configured to, with the at least one processor, cause the performance of the OLT according to the first aspect.

According to a second example aspect, a method is disclosed comprising, during a time window:

initiating a tuning cycle by starting the tuning of one or more burst receiver components within an optical line terminal, OLT; wherein the OLT is configured to communicate in a point-to-multipoint optical network with optical network units, ONUs; wherein upstream burst signals originating from one or more ONUs can be received by the OLT at any time during the time window;

if detecting a burst signal within a first period, extending the tuning cycle by a second period to continue the tuning of the one or more burst receiver components;

if detecting at least one predetermined pattern within the burst signal within the second period, extending the tuning cycle to decode the burst signal; and else, terminating the tuning cycle by initiating a next tuning cycle.

According to a third example aspect, a computer-implemented method is disclosed comprising, during a time window:

initiating a tuning cycle by starting the tuning of one or more burst receiver components within an optical line terminal, OLT; wherein the OLT is configured to communicate in a point-to-multipoint optical network with optical network units, ONUs; wherein upstream burst signals originating from one or more ONUs can be received by the OLT at any time during the time window;

if detecting a burst signal within a first period, extending the tuning cycle by a second period continue the tuning of the one or more burst receiver components;

if detecting at least one predetermined pattern within the burst signal within the second period, extending the tuning cycle to decode the burst signal; and else, terminating the tuning cycle by initiating a next tuning cycle.

According to a fourth example aspect, a computer program product is disclosed comprising computer-executable instructions for performing the steps according to the third example aspect when the program is run on a computer.

BRIEF DESCRIPTION OF THE DRAWINGS

Some example embodiments will now be described with reference to the accompanying drawings.

DETAILED DESCRIPTION OF EMBODIMENT(S)

Figure 1:
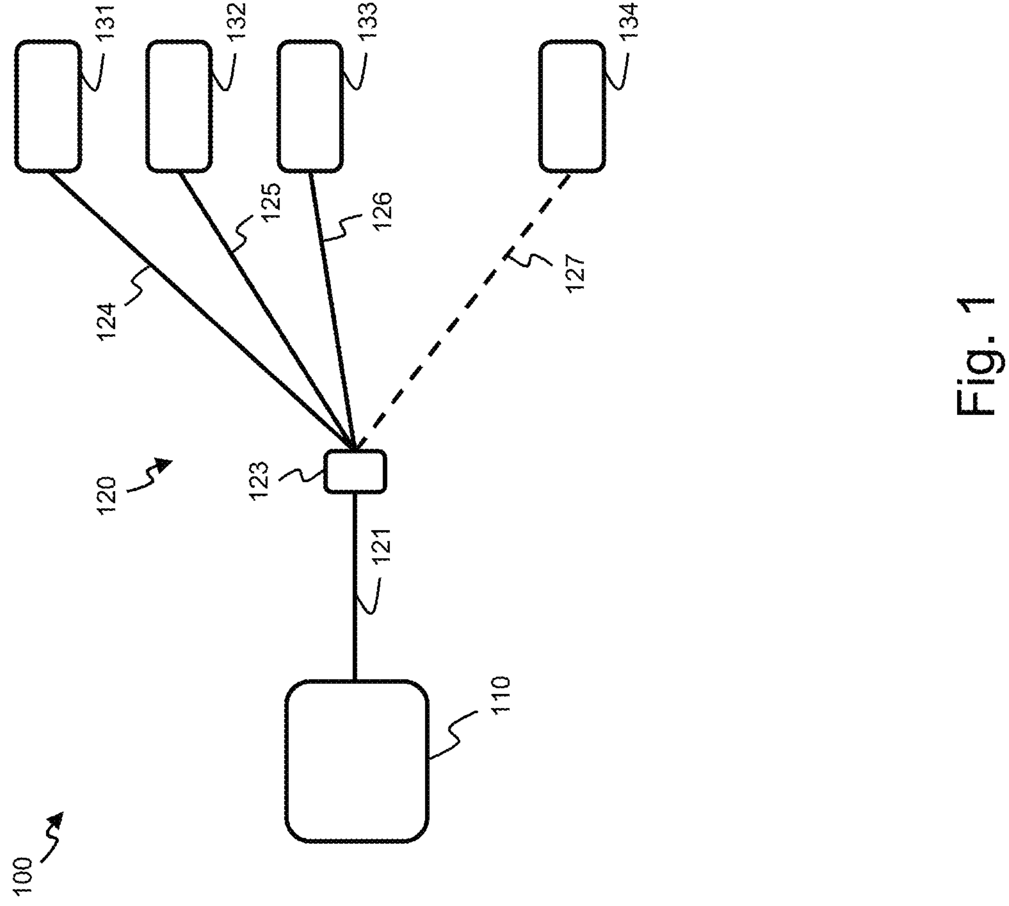
FIG. 1 shows a schematic block diagram of an example point-to-multipoint optical network comprising an optical line terminal, OLT, according to example embodiments.

FIG. 1 shows a schematic block diagram of an example point-to-multipoint optical network 100, in particular a passive optical network, PON. The optical network 100 comprises an optical line terminal 110, OLT, and a plurality of optical network units, ONUs 131, 132, 133, connected via an optical distribution network, ODN 120. In this example, the OLT 101 is connected to three ONUs 131, 132, 133, however, the OLT 110 may be connected to fewer or more endpoints. The ODN 120 has a tree structure comprising an optical feeder fibre 121, one or more passive optical splitters/multiplexors 123, and a plurality of optical distribution fibres or drop fibres 124, 125, 126 that connect the splitter/multiplexor 123 to the respective ONUs 131, 132, 133. In the downstream, the passive optical splitter/multiplexor 123 splits the optical signal coming from the OLT 110 into lower power optical signals for the connected ONUs 131, 132, 133, while in the upstream direction, the passive optical splitter/multiplexor 123 multiplexes the optical signals coming from the connected ONUs 131, 132, 133 into a burst signal for the OLT 110.

The passive optical network 100 may be a Gigabit passive optical network, GPON, according to the ITU-T G.984 standard, a 10× Gigabit passive optical network, 10G-PON, according to the ITU-T G.987 standard, a 10G symmetrical XGS-PON according to the ITU-T G.9807 standard, a four-channel 10G symmetrical NG-PON2 according to the ITU-T G.989 standard, a 25GS-PON, a 50G-PON according to the ITU-T G.9804 standard, or a next generation passive optical network, NG-PON. The passive optical network 100 may implement time-division multiplexing, TDM, or time- and wavelength-division multiplexing, TWDM.

The OLT 110 further comprises one or more burst receiver components, which can be any circuitry, element, or device configured to receive and decode upstream optical signals transmitted by the connected ONUs 131, 132, 133. Correct reception and decoding of the upstream optical signals typically requires tuning the burst receiver components to the respective signals. Typically, this tuning is performed on a known bit pattern within the upstream signal, i.e. a preamble, that precedes the actual data or payload within the signal. The upstream transmissions of the connected ONUs 131, 132, 133 are scheduled. As such, the respective arrival times of the upstream signals are known by the OLT 110. This allows optimizing the tuning of the burst receiver components.

An ONU 134 that is not connected to the optical network 100 may seek to join the optical network 100, i.e. a joining ONU 134. Activation of a joining ONU 134 is typically performed during a so-called ranging procedure. To this end, a joining ONU 134 transmits an upstream burst signal for joining the optical network to the OLT 110. To avoid interference with the scheduled upstream transmissions of the connected ONUs 131, 132, 133, a quiet window is typically provided. During the quiet window, joining ONUs 134 are free to transmit burst signals to the OLT 110 for joining the optical network, while connected ONUs 131, 132, 133 are not allowed to transmit upstream signals. In other words, joining ONUs 134 may transmit upstream burst signals at any time during the quiet window. The duration or length of a quiet window may, for example, be between 250 μs and 450 μs. Upon joining the optical network a joining ONU 134 becomes a connected ONU 131, 132, 133. Other modes of operation in optical networks may allow free transmission of upstream burst signals by connected ONUs 131, 132, 133, e.g. contention-based allocation, contention-based grants, or contention-based functions.

It is thus a challenge to tune the burst receiver components during time windows wherein burst signals can be received at any time by the OLT, as the time of arrival of these burst signals is unknown. Additionally, multiple burst signals associated with different ONUs 131, 132, 133, 134 may be received simultaneously at the OLT 110. To this end, burst receiver components are typically reset periodically, e.g. during a quiet window during ONU activation, followed by tuning the burst receiver components. The tuned burst receiver components can then detect and decode burst signals. If no burst signal is detected by the tuned components or a burst signal has been decoded, the tuned burst receiver components are reset again.

This has the problem that the burst receiver components are tuned after every periodical reset which can be inefficient if the reset is not timely, leading to useless tuning of the burst receiver components. This can increase the ranging time substantially, i.e. the time to complete a ranging procedure. Additionally, optical networks with increased upstream transmission rates can have increased tuning times as additional burst receiver components have to be tuned such as, for example, an equalizer. This can further increase the ranging time. It may thus be desirable to avoid excessive and/or superfluous tuning of burst receiver components to limit delays in ONU activation or improve contention-based allocation.

Figure 2:
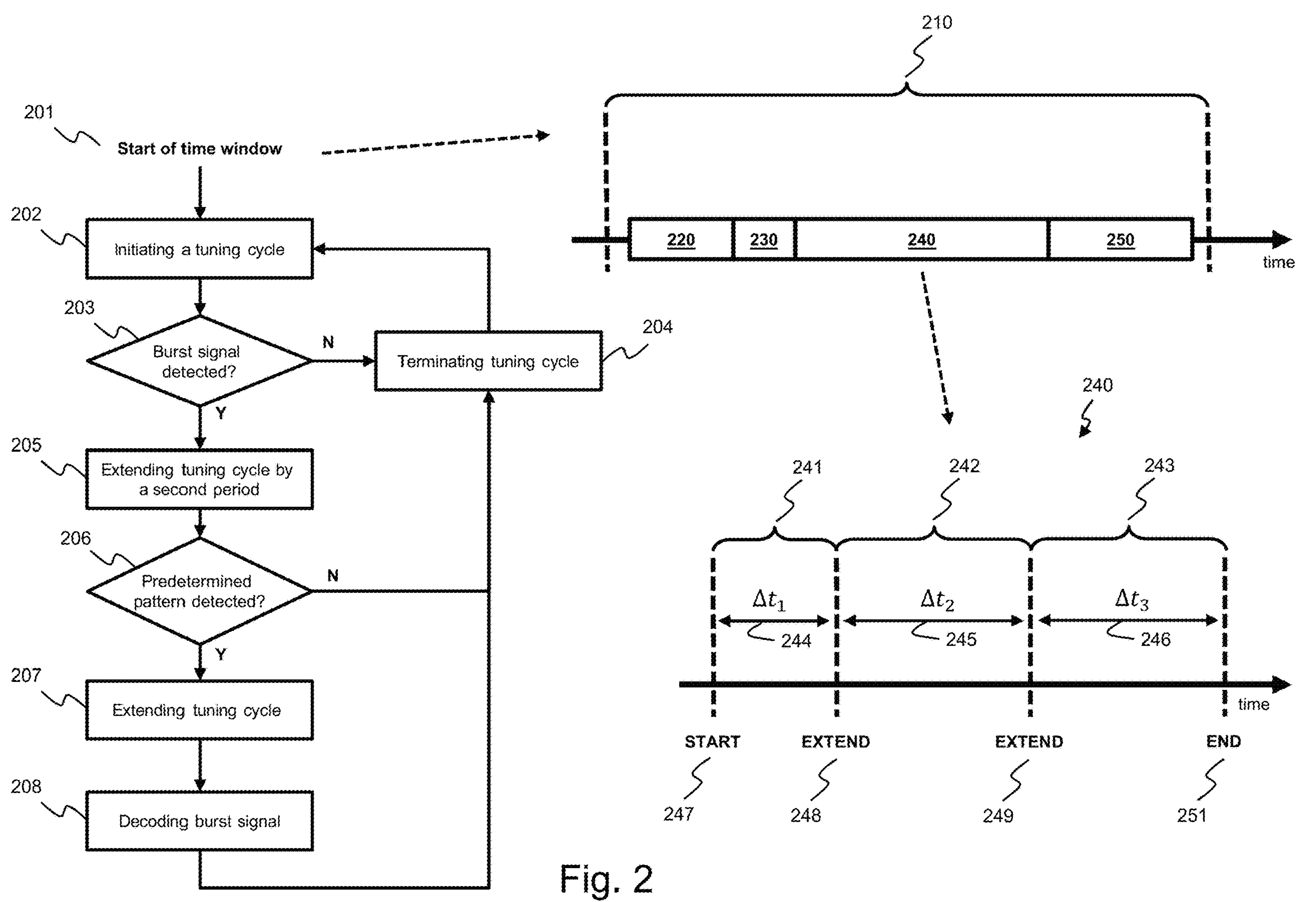
FIG. 2 shows steps performed by an OLT comprising means configured for managing the tuning of one or more burst receiver components, according to example embodiments.

FIG. 2 shows steps 200 performed by an OLT comprising means configured for managing the tuning of one or more burst receiver components, according to example embodiments. The means are configured to perform steps 200 during a time window 210. The time window 210 may be an interval in time during which ONUs are allowed to transmit upstream burst signals freely, i.e. at any time. The time window 210 can, for example, be a quiet window during ONU activation and/or a period during which ONU traffic is scheduled according to a contention-based allocation.

In a first step 202, following the start of a time window 210, a tuning cycle 220, 230, 240, 250 is initiated. This is achieved by starting the tuning of one or more burst receiver components within the OLT. Tuning a burst receiver component may, for example, include adjusting the settings of the burst receiver component based on a received optical signal. Initiating 202 a tuning cycle 240 starts a first period 241 of the tuning cycle 240. The means of the OLT are configured to detect the presence of an optical signal, i.e. a burst signal, at the OLT during this first period 241.

During the first period 241, the burst receiver components gradually converge or settle to a partially tuned state. This partially tuned state allows more reliable detecting of burst signals at the OLT, as more responsive and more reliable indicators to determine the presence of a burst signal can be used, e.g. compared to untuned burst receiver components.

If a burst signal is detected during the first period 241, the tuning cycle is extended 248 by a second period 242 in step 205. This allows providing more time to the burst receiver components to continue their respective tuning. Else, if no burst signal is detected during the first period 241, the tuning cycle 240 is terminated in step 204. In other words, tuning cycle 240 is terminated upon completion of the first period 241 if no burst signal is detected during this period 241. This allows avoiding superfluous tuning time as continuing the tuning of the one or more burst receiver components is futile when no burst signal is present.

This has the advantage that activation of joining ONUs during a ranging procedure can be more efficient, as the time to perform the ranging procedure can be reduced. It is a further advantage that contention-based allocation of ONUs can be more efficient. It is a further advantage that burst receiver components with a substantial tuning time can be tuned efficiently, and that a substantial number of burst receiver components can be tuned efficiently.

The first period 241 may be characterized by a predetermined amount of time $\Delta t_1$ 244. In other words, the first period 241 may start upon initiating the tuning cycle 240 and end after the predetermined amount of time $\Delta t_1$ 244 has elapsed if no burst signal is detected. It will be apparent that the first period 241 is extended 248 when detecting a burst signal and, thus, the length of the first period can be shorter than the predetermined amount of time $\Delta t_1$ 244 when detecting a burst signal during the first period 241.

The predetermined amount of time $\Delta t_1$ 244 may be indicative for a minimum tuning time of the burst receiver components such that a burst signal can be detected with a predetermined accuracy. The first period 241 may thus provide sufficient time for the burst receiver components to reach a partially tuned state that allows detecting a burst signal with a predetermined accuracy. This allows ruling out the presence of a burst signal at the OLT upon completion of the first period 241 with a predetermined probability or certainty. In doing so, terminating the tuning cycle 240 can be performed reliably at the end of the first period 241.

The predetermined amount of time $\Delta t_1$ 244 may be determined by the tuning time of the burst receiver component used for detecting a burst signal during the first period 241. The predetermined amount of time $\Delta t_1$ 244 may, for example, be around 10 ns. Alternatively, or complementary, the predetermined amount of time $\Delta t_1$ 244 may be determined according to the specifications and requirements of the optical network. Increasing the predetermined amount of time $\Delta t_1$ 244 can allow more time to partially tune the burst receiver components. As such, a tuning cycle 240 can be terminated with a higher confidence at the end of the first period 241, and more time is provided to detect a burst signal. On the other hand, decreasing the predetermined amount of time $\Delta t_1$ 244 allows reducing futile tuning time by terminating a tuning cycle 240 faster.

Figures 3A, 3B, 3C:
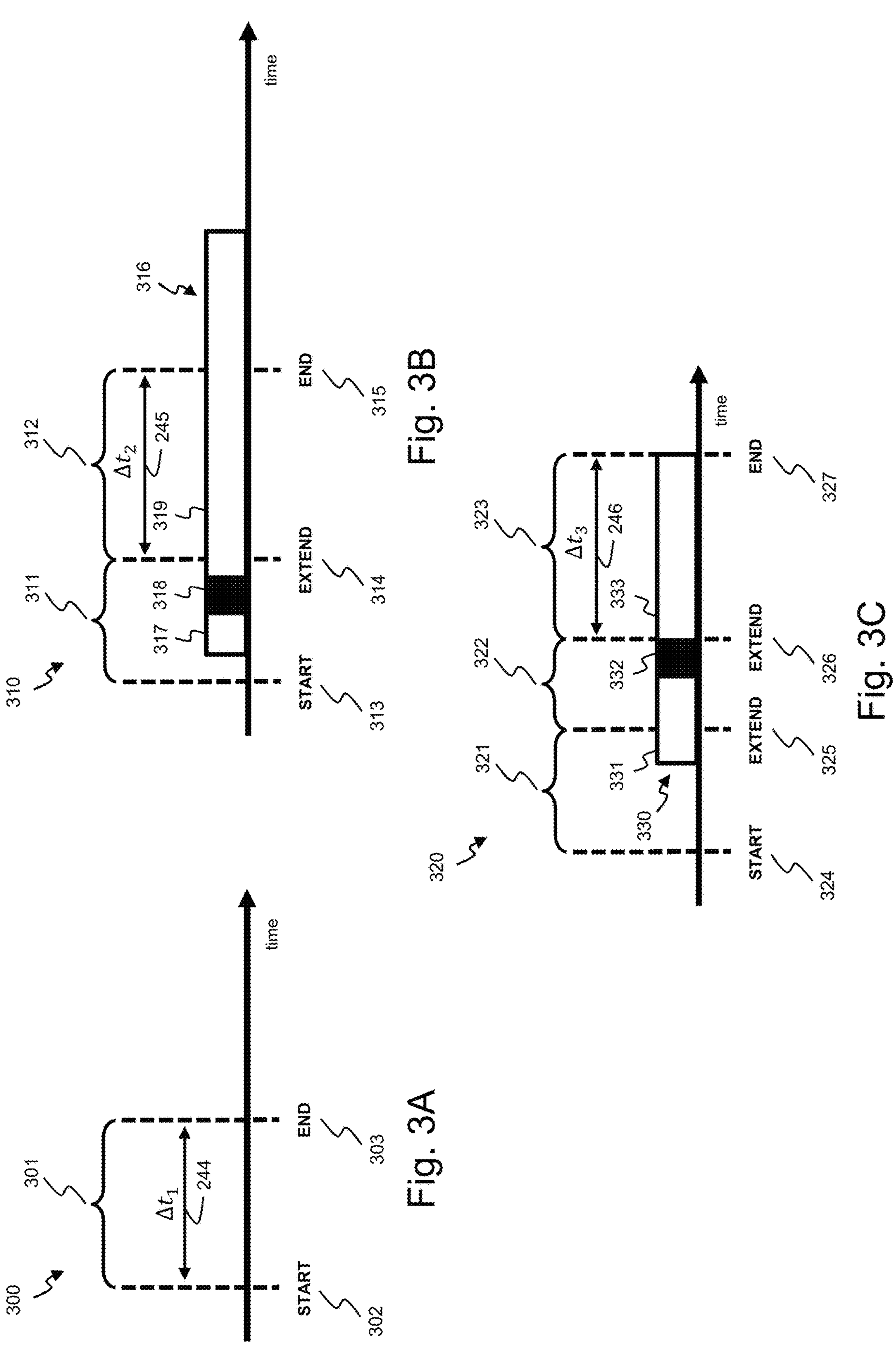
FIG. 3A shows an example embodiment of a tuning cycle comprising a first period.
FIG. 3B shows an example embodiment of a burst signal for joining the optical network that is received during a tuning cycle comprising a first period and a second period.
FIG. 3C shows an example embodiment of a burst signal for joining the optical network that is received during a tuning cycle comprising a first period, a second period, and a third period.

FIG. 3A shows an example embodiment of a tuning cycle 300 with a first period 301. The first period 301 is started at time 302 by starting the tuning of one or more burst receiver components. After the predetermined amount of time $\Delta t_1$ 244 has elapsed without detecting a burst signal, the tuning cycle is terminated at time 303 by initiating a next tuning cycle (not shown in FIG. 3A).

Returning to FIG. 2, if the presence of a burst signal is established during the first period 241, the tuning cycle 240 is extended by a second period 242. During this second period 242 the burst signal is searched for at least one predetermined pattern. The predetermined pattern may indicate that the OLT has not yet missed any valuable data within the burst signal, i.e. that the valuable data will be received later. In other words, the predetermined pattern may precede the valuable data within a burst signal. Valuable data may include any portion of the optical signal that includes information intended for the OLT that is not solely used for tuning the burst receiver components, for delineation, or for time alignment. Valuable data may for example include, amongst others, payload data bits, control bits, headers, metadata, a frame check sequence, and framing bits.

If the at least one predetermined pattern is not detected during the second period 242, the tuning cycle 240 is terminated in step 204 by initiating a next tuning cycle 250. This can further improve the efficiency of ONU activation and contention-based allocation as decoding of burst signals with missing valuable data can be avoided, i.e. decoding of invalid burst signals can be avoided. If the at least one predetermined pattern is detected during the second period 242, the tuning cycle 240 is extended 249 again in step 207. This extension 249 of the tuning cycle provides time for decoding the valid burst signal.

The second period 242 may be characterized by a predetermined amount of time $\Delta t_2$ 245. In other words, the second period 242 may start upon extending the first period 241, and end after the predetermined amount of time $\Delta t_2$ 245 has elapsed if the predetermined pattern is not detected. It will be apparent that the second period 242 is extended 245 upon detecting the predetermined pattern and, thus, the length of the second period 242 can be shorter than the predetermined amount of time $\Delta t_2$ 245 when detecting the predetermined pattern during the second period 242.

The predetermined amount of time $\Delta t_2$ 245 may be indicative for a minimum tuning time of the burst receiver components to achieve a tuned state to detect the at least one predetermined pattern with a predetermined accuracy. The second period 242 may thus provide sufficient time for the burst receiver components to reach a tuned state such that the predetermined pattern can be detected with a predetermined accuracy. This allows ruling out the presence of the predetermined pattern upon completion of the second period 242 with a predetermined probability or certainty.

The tuned state may be characterized by a certain level or extent of tuning, i.e. a certain level of convergence. The tuned state may correspond to a substantially completed tuning of the one or more burst receiver components. Substantially completed tuning may, for example, be achieved when the settings of a burst receiver component no longer deviate substantially in time by the tuning. The predetermined amount of time $\Delta t_2$ 245 may, for example, be around 100 ns. This allows reliable detecting of a valid burst signal within the second period 242.

Alternatively or complementary, the tuned state may correspond to a lower level of tuning, i.e. an incomplete tuning state, that is sufficient to detect the predetermined pattern with a lower accuracy. This can allow faster termination of the tuning cycle. It will be apparent that the tuning of burst receiver components may continue even after achieving a substantially completed tuning state. For example, a burst receiver component may continue to monitor a burst signal to improve its tuned state, even after reaching a substantially completed tuning state.

Detecting the predetermined pattern may be achieved by detecting a preamble pattern and/or a delimiter pattern indicative for the start of valuable data within a burst signal. The at least one predetermined pattern that is detected during the second period 242 may thus include a preamble and/or a delimiter, i.e. known bit patterns within the burst signal. The preamble and delimiter precede the valuable data within the burst signal. The delimiter may separate the preamble from the valuable data. Detecting the at least one predetermined pattern can thus include detecting a known preamble pattern within the burst signal, and/or detecting a known delimiter pattern within the burst signal. Detecting a delimiter may, for example, include a delimiter search.

Detecting a delimiter can further be performed after detecting a preamble. In other words, a preamble may be searched for during a first portion of the second period 242 and a delimiter may be searched for during a second portion of the second period 242, i.e. after detecting the preamble. This can further allow terminating the tuning cycle if the preamble pattern is not found within the burst signal during the first portion of the second period 242.

FIG. 3B shows an example embodiment of a burst signal 316 for joining the optical network that is received during a tuning cycle 310. The tuning cycle 310 comprises a first period 311 and a second period 312. The burst signal 316 may comprise a preamble 317 for tuning the burst receiver components, valuable data 319 that includes information intended for the OLT, and a delimiter 318 that separates the preamble 317 from the valuable data 319.

The presence of the burst signal 316 may be detected during the first period 311. As such, the tuning cycle 310 is extended by a second period 312. During the second period 312, the means may be configured to detect the predetermined pattern by detecting the delimiter 318. In the example of FIG. 3B, the predetermined pattern is not detected as the delimiter 318 was already received by the OLT during the first period 311. As such, a portion of the valuable data 319 has already been missed by the OLT and, thus, decoding the burst signal 316 is inefficient or even useless. Therefore, the second period 312 is terminated after the predetermined amount of time $\Delta t_2$ 245 has elapsed to avoid superfluous tuning time. A next tuning cycle (not shown in FIG. 3B) may be initiated upon termination of tuning cycle 310.

Returning again to FIG. 2, the tuning cycle 240 may further be extended 249 by a third period 243 in step 207 upon detecting the predetermined pattern during the second period 242. The third period 243 may be characterized by an amount of time $\Delta t_3$ 246 to complete the decoding of the burst signal in step 208. The tuning cycle 240 may thus be extended for a duration that is sufficient to completely decode a burst signal. It will be apparent that the length or duration of the third period, i.e. the amount of time $\Delta t_3$ 246, may vary for respective tuning cycles 220, 230, 240, 250. For example, decoding a valid burst signal in tuning cycle 240 may require more time than decoding a valid burst signal in tuning cycle 250, if the burst signal received in tuning cycle 240 comprises substantially more valuable data. Alternatively, the length or duration of the third period 243 may be fixed when the amount of valuable data within each burst signal is known a priori.

The third period 243 and, thus, the tuning cycle 240 ends 251 after completing the decoding of the burst signal. A next tuning cycle may be initiated while the time window is ongoing, i.e. has not ended. Iteratively executing tuning cycles during the time window can allow decoding a plurality of burst signals. This can further allow a plurality of ONUs to efficiently join the optical network during a ranging procedure.

FIG. 3C shows an example embodiment of a burst signal 330 for joining the optical network that is received during a tuning cycle 320. The tuning cycle 320 comprises a first period 321, a second period 322, and a third period 323. The burst signal 330 may comprise a preamble 331 for tuning the burst receiver components, valuable data 333 that includes information intended for the OLT, and a delimiter 332 that separates the preamble 331 from the valuable data 333.

The presence of the burst signal 330 may be detected during the first period 321. As such, the tuning cycle 320 is extended by a second period 322. The predetermined pattern is detected during the second period 322 by detecting the delimiter 332, i.e. the bit pattern indicative for the start of valuable data 333. As such, the tuning cycle 320 is extended at time 326 by the third period 323. Alternatively, detecting the predetermined pattern can include first detecting a preamble pattern 331 during a first portion of the second period 322 and only thereafter detecting the delimiter 332 during a second portion of the second period 322. This can further allow faster termination of the tuning cycle if the preamble pattern is not found first within the burst signal.

The burst signal is decoded during the third period 323, thereby obtaining the valuable data 333 from the burst signal 330. The length or duration of the third period 323 may depend on the amount of valuable data 333 in the burst signal. After decoding the burst signal 330, the tuning cycle 320 may be terminated 327 by initiating a next tuning cycle (not shown in FIG. 3C).

Figure 4:
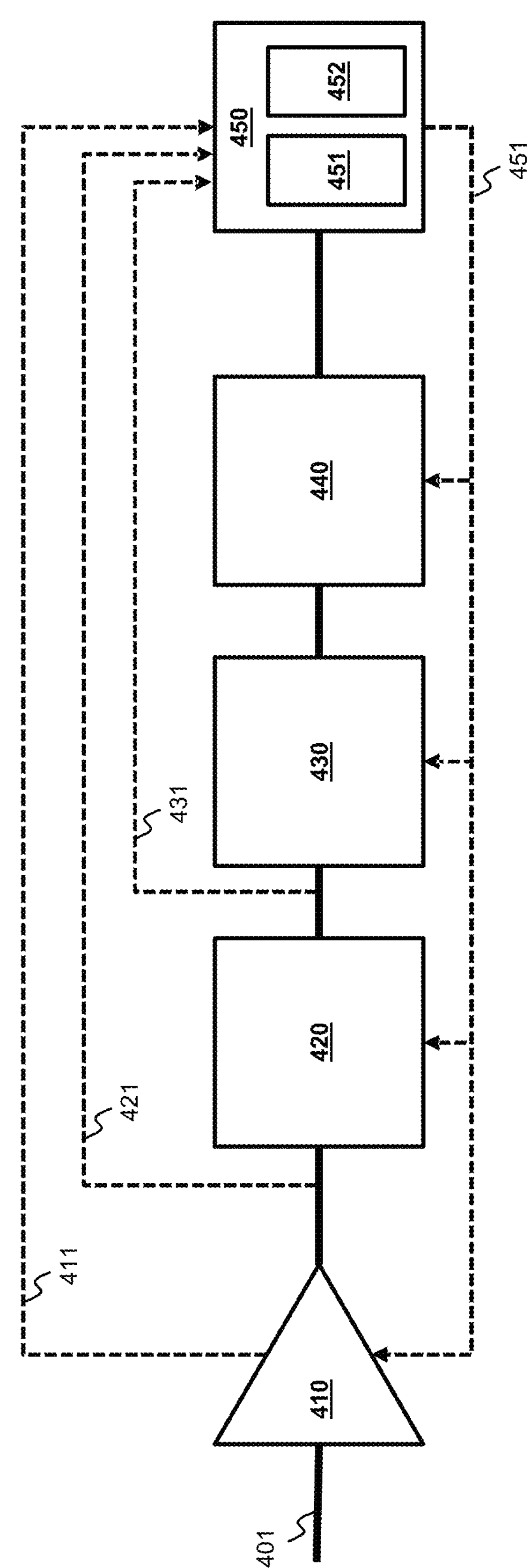
FIG. 4 shows an example embodiment of an optical line terminal, OLT, comprising one or more burst receiver components and means configured for managing the tuning of the one or more burst receiver components according to example embodiments.

FIG. 4. Shows an example embodiment of an OLT 400 comprising one or more burst receiver components 410, 420, 430, 440, and means 450 configured for managing the tuning of the one or more burst receiver components 410, 420, 430, 440. The OLT 400 may receive upstream burst signals originating from ONUs at input 401.

The burst receiver components may include a transimpedance amplifier 410, a clock data recovery device 420, an equalizer 430, a decoder 440, or any other circuitry, element, or device configured to receive and decode upstream optical signals received by the OLT 400. The means 450 may comprise at least one processor 451 and at least one memory 452. Computer program code may be included in the memory 452 that, when executed by the processor 451, causes the means 450 to perform the managing of the tuning of the burst receiver components according to embodiments. The means 450 may, for example, be a controller circuitry.

The means 450 or controller circuitry may receive one or more detection signals 411, 421, 431 associated with the burst receiver components 410, 420, 430, 440 within the OLT 400. Detecting a burst signal during the first period of a tuning cycle may be performed based on these one or more detection signals 411, 421, 431. In other words, the detection signals 411, 421, 431 may be indicative for the presence of a burst signal at an input 401 of the OLT 400. Alternatively or complementary, detection signals may be provided by other components such as, for example, a photodiode (not shown in FIG. 4).

The means 450 may further be configured to control the tuning of the one or more burst receiver components 410, 420, 430, 440, e.g. by means of a control signal 451. The control signal 451 may, for example, instruct the burst receiver components 410, 420, 430, 440 to initiate a tuning cycle, to extend a tuning cycle, and to terminate a tuning cycle.

Initiating a tuning cycle may be achieved by resetting the burst receiver components 410, 420, 430, 440 to start their respective tuning. Resetting a burst receiver component may, for example, be achieved by resetting the settings of the burst receiver components to a default setting. Resetting the burst receiver components at the start of a tuning cycle allows improving their performance compared to receiver components that are not reset, i.e. always-on components. For example, performing a reset of a burst receiver component 410, 420, 430, 440 can improve its reliability to detect optical signals. It will be apparent that one or more of the burst receiver components 410, 420, 430, 440 may be reset to initiate a tuning cycle.

Resetting burst components 410, 420, 430, 440 at the start of a tuning cycle further allows detecting burst signals at the OLT more reliably and/or faster, as more responsive and more reliable indicators for the presence of a burst signal, i.e. detection signals 411, 421, 431, can be used. It is a further advantage that the burst signal can be detected more reliably as a plurality of detection signals 411, 421, 431 can be used that are provided by different sources, i.e. by the different burst receiver components 410, 420, 430, 440.

Such a detection signal 411, 421, 431 may be a received signal strength indicator 411, RSSI, received from the transimpedance amplifier 410. Such an RSSI 411 may be provided by an RSSI circuit that is integrated in the transimpedance amplifier 410. Alternatively, an RSSI circuit may be provided within the OLT 400. Resetting a transimpedance amplifier 410 at the start of a tuning cycle may, for example, improve the performance of an integrated RSSI circuit compared to an always-on circuit.

Alternatively or complementary, a detection signal may be an output 421 of the transimpedance amplifier 410. In other words, the means 450 may be configured to detect the presence of a burst signal by observing the output 421 of the transimpedance amplifier 410. This has the further advantage that a burst signal can be detected faster as the output 421 can be observed on a high-speed signal path.

Alternatively or complementary, a detection signal may be an output 431 of the clock data recovery device 420. In other words, the means 450 may be configured to detect the presence of a burst signal by observing the output 431 of the clock data recovery device 420. For example, obtaining a clock data recovery lock is a reliable indicator for the presence of a burst signal and, vice-versa, failure to obtain a clock data recovery lock is a reliable indicator to terminate the tuning cycle. This can typically be detected by monitoring a lock signal outputted by the CDR 420.

Alternatively or complementary, a detection signal may be an indicator of the tuning behaviour of the equalizer 430 or an output of the equalizer 430. In other words, the means 450 may be configured to detect the presence of a burst signal by observing the tuning of the equalizer 430. For example, the presence or absence of a burst signal can be based on the convergence behaviour and an algorithm output of the equalizer tuning.

The resetting of the one or more burst receiver components 410, 420, 430, 440 may be performed at substantially the same time. This allows the burst receiver components 410, 420, 430, 440 to be tuned for the duration of the first period of a tuning cycle, thereby achieving a more highly tuned partially tuned state.

Alternatively, the respective burst receiver components 410, 420, 430, 440 may be reset at different times and/or in a predetermined order. In other words, the burst receiver components 410, 420, 430, 440 may be reset according to a predetermined sequence and/or a predetermined timing. For example, the transimpedance amplifier 410 can be reset first, thereby initiating a tuning cycle, followed by resetting the CDR 420, and thereafter resetting the equalizer 430. This allows controlling the resetting of the respective burst receiver components 410, 420, 430, 440 to optimize their performance. This has the further advantage that some burst receiver components can maintain a tuned state or partially tuned state of a previous tuning cycle for a portion of the first period of a next tuning cycle. This can improve detection of a burst signal. It is a further advantage that burst receiver components 410, 420, 430, 440 characterized by a substantial tuning time may start tuning earlier.

Figure 5:
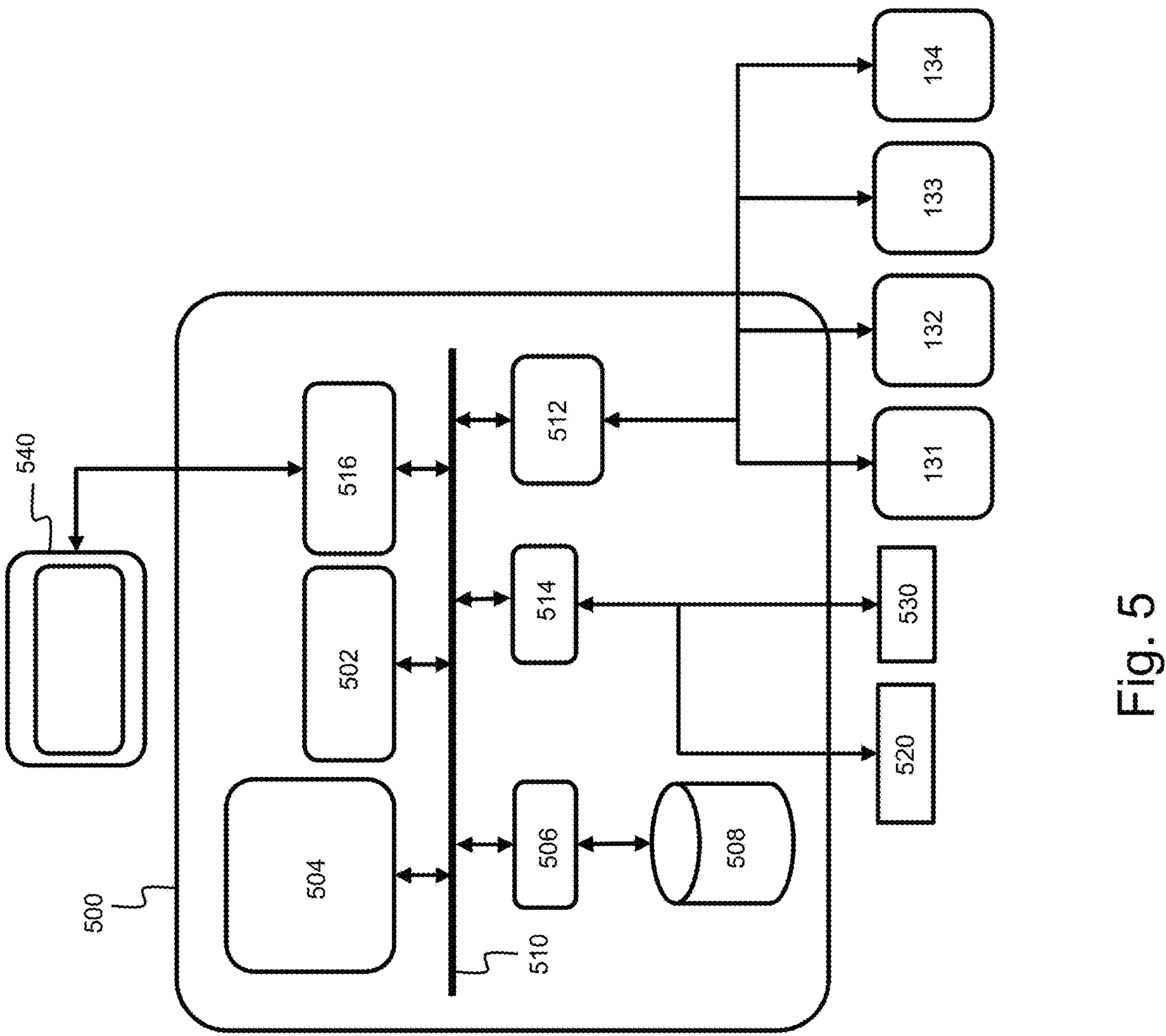
FIG. 5 shows an example embodiment of a suitable computing system 500 for performing one or several steps in embodiments of the invention.

FIG. 5 shows a suitable computing system 500 enabling to implement embodiments of the method for managing the tuning of one or more burst receiver components in an optical line terminal. Computing system 500 may in general be formed as a suitable general-purpose computer and comprise a bus 510, a processor 502, a local memory 504, one or more optional input interfaces 514, one or more optional output interfaces 516, a communication interface 512, a storage element interface 506, and one or more storage elements 508. Bus 510 may comprise one or more conductors that permit communication among the components of the computing system 500. Processor 502 may include any type of conventional processor or microprocessor that interprets and executes programming instructions. Local memory 504 may include a random-access memory (RAM) or another type of dynamic storage device that stores information and instructions for execution by processor 502 and/or a read only memory (ROM) or another type of static storage device that stores static information and instructions for use by processor 502. Input interface 514 may comprise one or more conventional mechanisms that permit an operator or user to input information to the computing device 500, such as a keyboard 520, a mouse 530, a pen, voice recognition and/or biometric mechanisms, a camera, etc. Output interface 516 may comprise one or more conventional mechanisms that output information to the operator or user, such as a display 540, etc. Communication interface 512 may comprise any transceiver-like mechanism such as for example one or more Ethernet interfaces that enables computing system 500 to communicate with other devices and/or systems, for example with one or more burst receiver components 410, 420, 430, 440. The communication interface 512 of computing system 500 may be connected to such another computing system by means of a local area network (LAN) or a wide area network (WAN) such as for example the internet. Storage element interface 506 may comprise a storage interface such as for example a Serial Advanced Technology Attachment (SATA) interface or a Small Computer System Interface (SCSI) for connecting bus 510 to one or more storage elements 508, such as one or more local disks, for example SATA disk drives, and control the reading and writing of data to and/or from these storage elements 508. Although the storage element(s) 508 above is/are described as a local disk, in general any other suitable computer-readable media such as a removable magnetic disk, optical storage media such as a CD or DVD-ROM disk, solid state drives, flash memory cards, . . . could be used. Computing system 500 could thus correspond to the controller circuitry 450 in the embodiments illustrated by FIG. 4.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An optical line terminal, OLT, configured to communicate in a point-to-multipoint optical network with optical network units, ONUs; wherein upstream burst signals originating from one or more ONUs can be received by the OLT at any time during a time window; the OLT comprising:

at least one memory including computer program code;

at least one processor configured to execute the computer program code to cause the OLT to perform, during the time window, initiating a tuning cycle by starting the tuning of one or more burst receiver components within the OLT;

if detecting a burst signal within a first period, extending the tuning cycle by a second period to continue the tuning of the one or more burst receiver components;

if detecting at least one pattern within the burst signal within the second period, extending the tuning cycle to decode the burst signal; and else, terminating the tuning cycle by initiating a next tuning cycle.

2. The optical line terminal, OLT, according to claim 1, wherein the first period is an amount of time indicative for a minimum tuning time for the one or more burst receiver components to detect a burst signal with a desired accuracy.

3. The optical line terminal, OLT, according to claim 1, wherein the second period is an amount of time indicative for a minimum tuning time for the one or more burst receiver components to achieve a tuned state to detect the at least one pattern within the burst signal with a desired accuracy.

4. The optical line terminal, OLT, according to claim 1, wherein the OLT is furth caused to perform extending the tuning cycle by a third period upon detecting the at least one pattern within the burst signal within the second period; wherein the third period is characterized by an amount of time to complete the decoding of the burst signal.

5. The optical line terminal, OLT, according to claim 1, wherein the OLT is further caused to perform the initiating of a tuning cycle by simultaneously resetting the respective one or more burst receiver components to start the tuning of the one or more burst receiver components.

6. The optical line terminal, OLT, according to claim 1, wherein the OLT is further caused to perform the initiating of a tuning cycle by resetting the respective one or more burst receiver components according to a sequence and/or a timing to start the tuning of the one or more burst receiver components.

7. The optical line terminal, OLT, according to claim 1, wherein the OLT is further caused to perform, during the time window, initiating a next tuning cycle after decoding a burst signal.

8. The optical line terminal, OLT, according to claim 1, wherein the OLT is further caused to perform the detecting of a burst signal based on one or more detection signals associated with the respective one or more burst receiver components; wherein the one or more detection signals are indicative for the presence of a burst signal at the OLT.

9. The optical line terminal, OLT, according to claim 1, wherein the one or more burst receiver components are selected from the group comprising a transimpedance amplifier, a clock data recovery device, an equalizer, and a decoder.

10. The optical line terminal, OLT, according to claim 8, wherein the respective one or more detection signals are a received signal strength indicator, RSSI; an output of the transimpedance amplifier; an output of the clock data recovery device; an indicator of the tuning behaviour of the equalizer; and/or an output of the equalizer.

11. The optical line terminal, OLT, according to claim 1, wherein the OLT is further caused to perform detecting the at least one pattern within the burst signal by detecting a preamble pattern and/or a delimiter pattern indicative for the start of valuable data within a burst signal.

12. A method comprising, during a time window:

initiating a tuning cycle by starting the tuning of one or more burst receiver components within an optical line terminal, OLT; wherein the OLT is configured to communicate in a point-to-multipoint optical network with optical network units, ONUs; wherein upstream burst signals originating from one or more ONUs can be received by the OLT at any time during the time window;

if detecting a burst signal within a first period, extending the tuning cycle by a second period to continue the tuning of the one or more burst receiver components;

if detecting at least one pattern within the burst signal within the second period, extending the tuning cycle to decode the burst signal; and else, terminating the tuning cycle by initiating a next tuning cycle.

13. A non-transitory computer-readable medium storing instruction, which when executed by a processor cause an apparatus including the processor to perform:

during a time window, initiating a tuning cycle by starting the tuning of one or more burst receiver components within an optical line terminal, OLT; wherein the OLT is configured to communicate in a point-to-multipoint optical network with optical network units, ONUs; wherein upstream burst signals originating from one or more ONUs are unallocated during the time window;

if detecting a burst signal within a first period, extending the tuning cycle by a second period to continue the tuning of the one or more burst receiver components;

if detecting at least one pattern within the burst signal within the second period, extending the tuning cycle to decode the burst signal; and else, terminating the tuning cycle by initiating a next tuning cycle.

* * * * *